US009604653B2

(12) United States Patent
Blum

(10) Patent No.: US 9,604,653 B2
(45) Date of Patent: Mar. 28, 2017

(54) METHODS FOR IMPROVED EQUIPMENT AND VEHICLE PERFORMANCE AND ENERGY EFFICIENCY THROUGH INTERFACES AND ENHANCED EXTRAPOLATIONS USING FACTORS SUCH AS THE VALUE OF POTENTIAL AND KINETIC ENERGY CHANGES

(71) Applicant: Michael Gerard Blum, Palo Alto, CA (US)

(72) Inventor: Michael Gerard Blum, Palo Alto, CA (US)

( * ) Notice: Subject to any disclaimer, the term of this patent is extended or adjusted under 35 U.S.C. 154(b) by 77 days.

(21) Appl. No.: 14/217,012

(22) Filed: Mar. 17, 2014

(65) Prior Publication Data

US 2014/0350747 A1 Nov. 27, 2014

Related U.S. Application Data

(60) Provisional application No. 61/800,642, filed on Mar. 15, 2013.

(51) Int. Cl.
*B60W 50/08* (2012.01)
(52) U.S. Cl.
CPC ........ *B60W 50/087* (2013.01); *B60W 50/085* (2013.01)

(58) Field of Classification Search
None
See application file for complete search history.

(56) References Cited

U.S. PATENT DOCUMENTS

| | | | |
|---|---|---|---|
| 6,453,731 B1 * | 9/2002 | Yaegashi | B60K 35/00 73/114.52 |
| 2008/0294339 A1 * | 11/2008 | Tauchi | G01C 21/3469 701/455 |
| 2014/0032062 A1 * | 1/2014 | Baer | G07C 5/08 701/51 |
| 2014/0121956 A1 * | 5/2014 | Jastrzebski | H01M 10/48 701/123 |

\* cited by examiner

*Primary Examiner* — Redhwan K Mawari
*Assistant Examiner* — Edward Torchinsky
(74) *Attorney, Agent, or Firm* — David R. Stevens; Stevens Law Group

(57) ABSTRACT

Methods and systems are provided for improving vehicle performance and efficiency. The performance is improved by allowing the user to customize parameters and other features through the use of an interface accessible to the vehicle operator or owner, which enables and encourages development and rewards many stakeholders including vehicle producers and third party vendors (e.g. aftermarket), customers, maintenance service providers, and insurance companies. One form of performance improvement, a novel method of accomplishing an enhanced form of energy efficiency calculation for near real-time display to the operator, is provided in detail.

1 Claim, 3 Drawing Sheets

Example Flow of Enhanced Energy Consumption Calculation

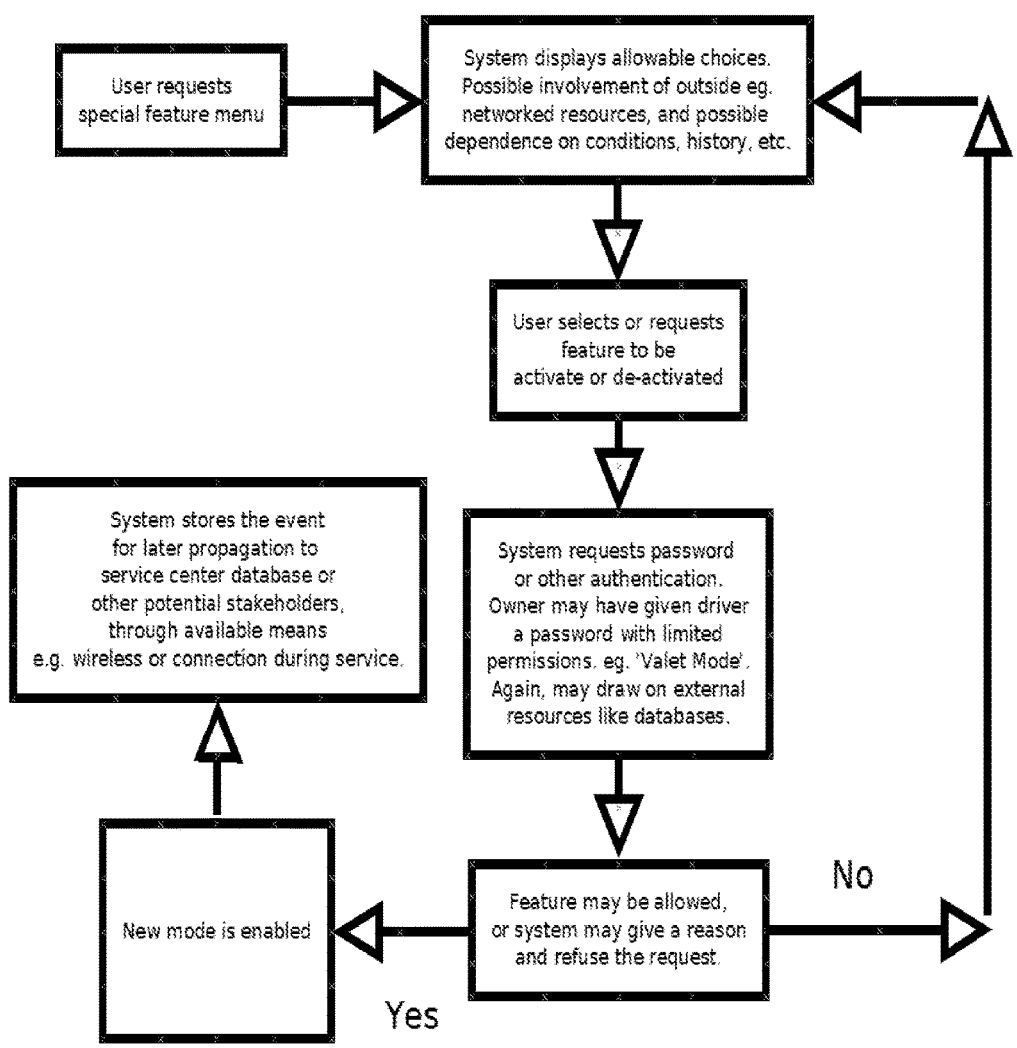
Figure 1: Example of Proposed Equipment User Permission Flow

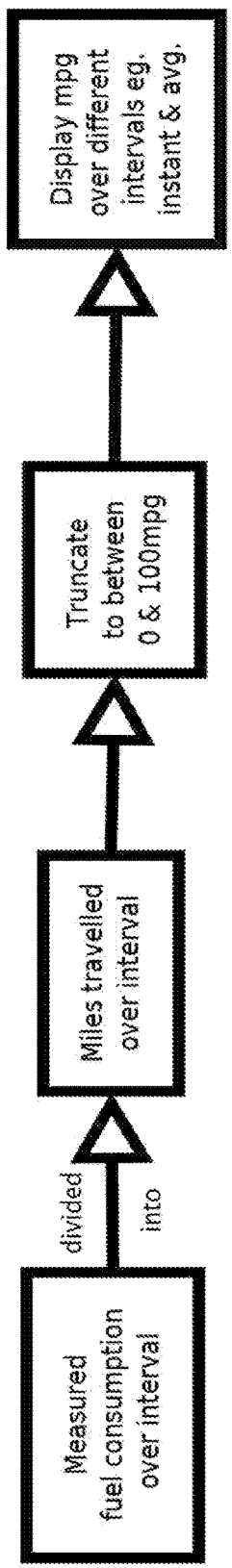

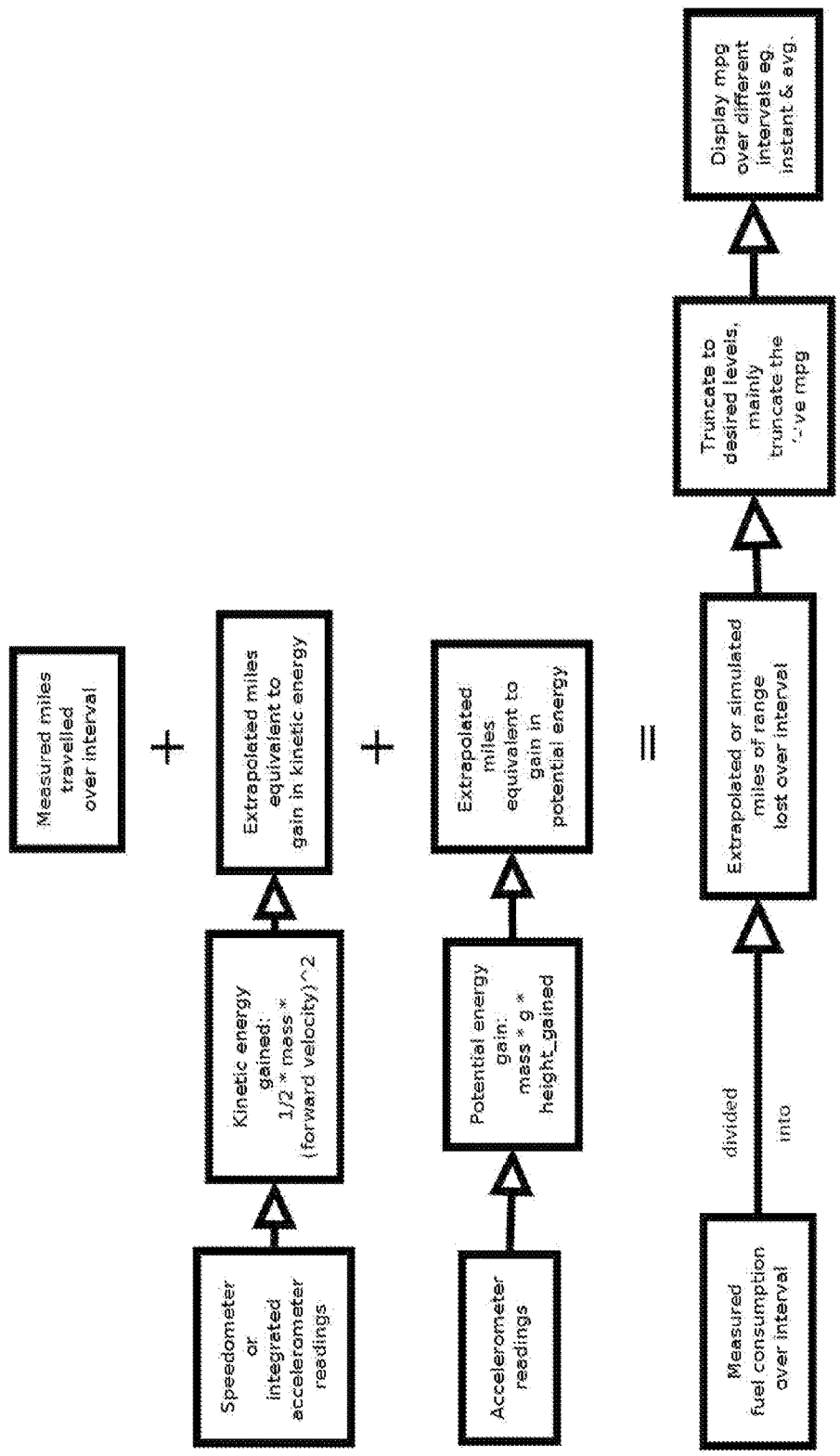
Figure 3: Example Flow of Enhanced Energy Consumption Calculation

METHODS FOR IMPROVED EQUIPMENT AND VEHICLE PERFORMANCE AND ENERGY EFFICIENCY THROUGH INTERFACES AND ENHANCED EXTRAPOLATIONS USING FACTORS SUCH AS THE VALUE OF POTENTIAL AND KINETIC ENERGY CHANGES

CROSS-REFERENCE TO RELATED APPLICATIONS

This application claims the benefit of and priority to U.S. Provisional Patent Application Ser. No. 61/800,642, entitled "Low Cost Methods for Harnessing, Controlling, and Efficiently Using Energy", filed Mar. 15, 2013, which is incorporated herein in its entirety

FIELD

This invention is related to the field of vehicle operation, interfaces, and instrumentation, and more specifically to improvements in performance and efficiency.

BACKGROUND

The statements in this section merely provide background information related to the present disclosure, and do not attempt to reflect all prior art or practices in the literature.

The history of vehicles is largely a history of modifications based on prior versions and consumer/owner/operator preferences. At times, as it is in other fields, development is driven by enthusiasts modifying and experimenting. This requires often appreciable expenditures of capital and labour in a partially wasteful manner; undoing prior work, throwing away parts and consumables, etc. in order to achieve what could in many cases be carried out more expediently and cost effectively by the factory. Accordingly, improved feedback and deal-making is needed at the business and consumer level, to enable reduced waste, a higher standard of living, and a less-polluted environment. As will be seen, the two aspects of this invention do that in a novel and elegant manner.

The first problem addressed is that of persuading the vehicle producers that it is worth their while not to just engineer the vehicles specifically to function adequately in the hands of a very unskilled operator, ones with no significant understanding of vehicle dynamics or ability to manage the systems if they are allowed to deviate from factory-set conditions chosen for a minimum of performance under all conditions regardless of what the operator does.

The engineering of the Ford Model T provides an illustrative example. The engine had a severely restricted air intake which lengthened the engine longevity substantially; Without the restriction, horsepower purportedly increased from 22 to 70 hp. As is the general practice today, a minimum longevity came first in engineering. This meant that those wishing a faster vehicle had to be prepared to buy or expend labour on the car and in general, also buy more parts. They could opt to decline from that pursuit, or buy a competitor's car.

Had Ford offered the car with a restrictor-removing switch which when pressed enabled 70 hp, many model Ts would have had shorter engine lives, eventually affecting sales negatively assuming most people wanted normal engine longevity in a car. Perhaps some customers also had friends or relatives who used the feature unbeknownst to the owner, leaving him or her surprised with a prematurely failed engine. Perhaps in mountainous terrain, using the feature only above 15000 feet altitude, no appreciable extra engine wear would result. However, if left on, perhaps accidentally, at lower altitudes, engine life could be compromised. This is an example of an advanced feature used incorrectly in a products that is sold without such a consumer override interface; a customer can be initially drawn to the feature set or performance figures, then use them incorrectly, and rapidly get themselves into trouble and blame the product. Had the hypothetical restrictor-remover feature been activated through the proposed interface, additional sales could have been expected from enthusiasts seeing that it is easier and cheaper to buy the model T mass-produced with the feature, than to buy a competitor's car and modify it. Further sales would result from people who can suddenly now afford the now-cheaper performance solution they desired.

A major part of the problem addressed is that energy conservation is most directly in the hands of the operators, with results varying in some cases by more than a factor of 3 in energy consumption by the same vehicle under the same driving conditions. When the vehicle is modified intelligently by those willing to accept any 'downsides', emissions can be reduced while the efficiency range increases even more. Some fraction of the lower-performing operators would be interested if they were convinced that the energy cost savings could be for them so high, and are capable of being trained to do so. The results, across millions of drivers, would be significant, and do not require a significant engineering effort or capital investment.

Improvements in instrumentation are important since they can help operators to recognize where efficiency gains might be made. In fact, one could suggest that drivers are in the best place to effectively utilize instrumentation-driven improvements, because they have the vehicle, a realistic environment, and are willing to drive and in many cases experiment without getting paid beyond energy consumption savings.

Existing fuel and energy consumption displays produce time lags and other artifacts resulting from use of crude algorithms. These lags are significant enough to demand that an experimenting driver drive at a constant speed over a sustained slope and road surface quality for inconvenient and appreciable time in order to allow the common fuel-time-speed integration gauge to suggest an average energy consumption (e.g. mpg) achieved.

Traffic and road conditions often change during such a test, hence diluting the test effectiveness. A single other driver in the way, or threatening to be in the way, or a bump in the road sufficient to cause a finely held gas pedal in a vehicle with an automatic transmission to move sufficiently to result in a gear change; Such types of disturbance events will ruin what amounts to a long measurement experiment effort. Minor, seemingly negligible disturbances, can also occur, and without direct and immediate feedback from the efficiency gauge, incorrect conclusions can be reached which result in wasted effort, frustration, and excess energy purchases.

Hence an interface and feature modification improvement is desired which enhances the familiar energy usage gauge into one which more accurately correlates and reflects the immediate effects of driving technique.

BRIEF DESCRIPTION OF THE DRAWINGS

FIG. 1 is a flow diagram illustrating one embodiment of the decision and processing flow of the proposed User Permission System, one which enables a new mode of operation and makes and begins to propagate and store records associated with the event. It is a generic example process which embodies the proposed operator permission interface, allowing e.g. a driver to at times override battery charge decisions made by a hybrid car management system.

FIG. 2 is a simplified illustration of prior art algorithms commonly employed in energy efficiency instrumentation in/of numerous existing vehicles.

FIG. 3 illustrates how some of the improved algorithm aspects can be combined to yield superior display content; content and results noticeably different and more useful than that provided by existing art.

DETAILED DESCRIPTION

A consumer energy user override interface method is proposed addressing control and/or data management of the vehicle and its instrumentation. Uses a user interface such as a GUI, or tactile feature, such as for example a pushbutton, in conjunction with a controller/processor which logs desired conditions of use for each feature offered, and the timing of the presentation of the offer/feature activation e.g. at a given time relative to the occurrence of the desired conditions, or later (e.g. when safer to perform or after additional data is taken from sensors).

With the proposed invention, it is possible for the driver to quickly see the fuel or electricity consumption along a given stretch of road in a given gear at a given speed, and at one glance, quickly change speed or gear, and see the difference in efficiency, while under approximately the same wind, road surface, etc. condition, since a change can be effected, and an additional data point taken, within a couple of seconds later; basically on the same stretch of road. One would no longer be restricted to sections of road without changes in elevation, direction, wind-shading trees, etc.

The purpose is to allow enabled users to temporarily or permanently change an embedded algorithm to suit their custom goals. The system is novel in that it lowers corporate and/or marketing reluctance to include or allow for certain types of features that enhance performance, efficiency, etc. in products marketed and sold to a wide variety of customers, including those untrained or having low technical abilities. An example of this can be taken from the automotive industry, which builds cars for the masses. Careful, technically minded, or risk-taking customers often modify the cars to achieve higher performance, often by performing modifications which can have the side effect of making the average user more likely to have trouble under certain conditions. This can range from the simple, e.g. traction control off, to less restricted intake and outflow pathways for engines. The latter can result in difficult starting. This in turn can be helped by attention to procedures perhaps developed uniquely or on-the-fly, ie. Not worthwhile to build in at stock form in the factory. Another example is in the stock algorithm for transmission shift points or hybrid vehicle decisions regarding when to charge and discharge a battery.

While it may not be worthwhile to 'complete the factor version' of many extra performance modes, and may for sake of avoidance of undesirable feedback (eg. from customers who for lack of understanding or intelligence, may misuse the feature and then complain that the car as a whole is 'bad'), avoid enabling this type of performance feature even if the vehicle systems could easily support it. It is in these situations that the offering of the proposed interface makes economic sense. See Figure "user permission interface block diagram".

The interface provides sufficient control to document (if desired) the users choice to accept responsibility when activating/requesting/accepting the modification event, and provides a programming routine/algorithm to handle any change in displays, operational parameter limits, indicated performance gauges, etc. deemed sufficient to persuade the user not to complain if he or she gets worse resulting performance compared to their expectations, when deviating from 'stock' trim. This hopefully results in a net increase in sales which now include customers desiring higher performance that they are willing to manage, while accepting the increased risk of damage or reduced component life. Those customers know that they agreed to documentation when activating key features, perhaps to the point that readers of their future reviews of the vehicle could access the records. The net result should be 'fair' reviews or 'fair' interpretation of the reviews, actually help sales rather than compromise them. Additionally, the list of features is a natural presentation of forum topics, which, for good vehicles, builds enthusiast demand for sales. See FIG. 1 "Example of Proposed Equipment-User Permission Flow". The same example, of this family of algorithms, could be used for many different features.

Proposed Feature Override/Enable User Interface Application Further Embodiment Examples. In one example, a solar system heat storage configuration is proposed; to make a specific choice different that automatically done by the controller; e.g. to make use of tank architecture and features, to overrule the default algorithm designed for average days, in favor of heating less water but to a higher temperature for a particular need before automatic return to normal.

Another example provides for a combustion engine electric hybrid vehicles, which overrides many cars' built-in algorithm which periodically expends gasoline to charge up the battery. If the customer is going up and down a long hill which takes several minutes, the driver could push a button or otherwise signal the system to deplete the battery as completely as allowable to satisfy battery life and emergency starting conditions, while going uphill. He/she knows that the car will then immediately have an extended downhill section sufficiently long to recharge the batteries. The batteries can be of different types, some energy efficient but not necessarily efficient under high charge or recharge currents, others costing more or being better at both, capacitors, and different engine settings, combined in such a fashion as to provide lowest overall system cost or highest efficiency or performance when requested.

Another example provides for diesel engine emissions control methods sometimes including a special or 'purge' routine which expends fuel in order to assist the catalytic converter. A user driving conservatively while attempting to get high mpg may see his mpg suddenly plummet when the vehicle goes into the purge routine. If the user had known that the drivetrain controller had determined that type of action to be necessary soon, he/she could have selected it to occur at a specific time, e.g. when about to go up a large incline, and ready to gain a little more speed. Such decisions and actions by the user might on occasion remove the need for the purge cycle to run, when it otherwise would have.

In many cases use, by the operator, of the interface (for example pushing a switch under certain conditions) can be accomplished by a controller which logs the diagnostic readings, choices in efficiency feedback etc, and/or assists marketing by having the 'proof' available to show the customer in the event of customer complaints over operational issues caused by their possibly improper use of the override. Can also have interface ask for a form of EULA which reminds/warns them that they are electing to take some risk and possibly to what degree. Can include group or parental controls, etc.

Improved accuracy and timeliness in indicated fuel consumption allows vehicle operators to see how efficient a gear they are in for the given speed, wind, road surface, terrain, etc. Existing fuel and energy consumption displays produce time lags and other artifacts resulting from use of crude algorithms. These lags are significant enough to demand that an experimenting driver drive at a constant speed over a sustained slope and road surface quality for inconvenient and appreciable time in order to allow the common fuel-time-speed integration gauge to suggest an average energy consumption (e.g. mpg) achieved.

The proposed invention includes a possible stand-alone enhancement to the familiar energy usage gauge into one which more accurately correlates and reflects the immediate effects of driving technique by using math which achieves the effect of extrapolating the drivable range gained or lost over an interval.

With this part of the proposed invention, the driver can relatively immediately see the fuel or electricity consumption along a given stretch of road in a given gear at a given speed, at one glance, quickly change speed or gear, and see the difference in efficiency, while under approximately the same wind, road surface, etc. condition, since a change can be effected, and an additional data point taken, within a couple of seconds later; basically on the same stretch of road. One would no longer be restricted to sections of road without changes in elevation, direction, wind-shading trees, etc.

Existing graphical display techniques could show the new type of trace, store or retrieve the efficiency history, freeing the driver from the distraction task of repeatedly scanning the gauge in order to see the results.

If it is employed together with the proposed permissions interface the driver would definitely be aware that the computed metric and possibly its display form have been modified so that he or she does not panic and think something is wrong with their vehicle. Since the improved instrument uses sensor feedback and near-immediate extrapolation of the effects, efficiency techniques are more easily identified/discovered as drivers respond to faster and more accurate efficiency feedback, helping them to recognize procedures and responses that save energy (and its cost).

This can lead to requests for development of further features (e.g. pulse and glide assisting overrides) to join the 'unlockables' list. Manufacturers could take advantage of the findings, to engineer changes where most beneficial e.g. to fuel efficiency, safety, or other profit, as well as reaping potential rewards from reporting real-world vehicle energy efficiencies consistently higher (with respect to standardized ratings) than those of their competitors.

To illustrate an example resulting improvement in an automotive miles per gallon display, imagine that you are driving at 75 mph and have 2 miles of flat ground range left. You are almost empty. If your mpg and range remaining display was of the typical type, it would be suggesting that you have 2 miles of range left based on prior averaging.

The true figure is affected by your kinetic energy; depending perhaps less on your previously calculated average consumption rate. Consequently, if you hit the brakes, the old gauge would take some time to update new range estimates, which although perhaps moving in the right direction, are still inaccurate, perhaps progressively so.

If the proposed gauge was available instead, observation of it would indicate firstly that more than 2 miles was available, but then that braking diminished it immediately, since you will not now coast as far. All prior art automotive fuel consumption and range-extrapolation instrumentation do not reflect this as quickly or as accurately, if at all. Nor do they properly handle the additional scenarios below.

'Hitting the gas hard' uses fuel, but instead of immediately lowering your mpg figure dramatically as typical existing vehicles indicate, the loss in indicated mpg, due to that transient event, should exist due to, and hence be a reflection of, higher drivetrain losses when speeding up the requested amount. Instead, many vehicle gauges indicate a large mpg (miles per gallon) drop; perhaps more than 75%. Typical calculations based only on amount of fuel used per unit distance, or rate of fuel divided by speed, will calculate/extrapolate fuel efficiency and range incorrectly, since the vehicle has not expended that last burst of fuel only to drive the last few seconds at its average speed or the speed over that interval. Much of the energy went into speeding the vehicle up and is now stored in kinetic energy form.

Many vehicles can actually convert energy more efficiently under increased load under certain conditions. This is a typical performance characteristic of internal combustion engines, which at light throttle opening settings suffer 'pumping losses' as the engine pulls against atmospheric pressure. It takes work to pull the intake air through a restriction. This has given rise to the now well known 'pulse and glide' technique of higher mpg driving. Any drivers practicing this technique, in a contemporary vehicle with a typical mpg gauge, are being told that the acceleration is extremely inefficient (e.g. 6 mpg) and that coasting while the engine is idling is very efficient (eg 100 mpg); basically the opposite of what is actually going on with the car, while suggesting to the driver, over the short term, that any pulse is bad, and a glide to a near or complete stop is desirable. These incorrect signals actually encourage worse fuel economy. A typical commuting segment involves a start from a stop, and a return to a stop, often a known distance ahead.

An example of production of the enhanced energy efficiency value, using the proposed method, is shown in FIG. 3. It is capable of showing the driver the optimum level of acceleration for those segments. One decision involved in the display is the truncation of dramatic energy loss (e.g. '-'ve extrapolated mpg when driver brakes hard). The preferred method is simple truncation of the value. It is easy to highlight an area around the zero mark, which in turn provides sufficient information at a glance to many drivers.

A decision can be made to put a baseline in the display to allow relative comparison to maximum achievable energy efficiency within different constraints eg. 'engine assumed to be on and in gear while coasting' or 'constant speed at the speed limit, with gentle changes when the limit changes' although other basis/bases could also be incorporated. Range remaining and its rate of change might be the favorite metric or 'channel' to display.

Unlike the case for most if not all present gauges, substantial loss in mpg should be reflected when brakes are applied, or corners are turned that cause extra friction, winds etc. The invention augments the immediate/current fuel consumed/unit distance with acknowledgment of what is going into kinetic energy, which represents converted but still stored energy enabling extra miles of range.

A further variation allows augmentation by acknowledgment of fuel being consumed to store potential energy, e.g. by extrapolating the range calculation along whatever the sensed slope is, and/or with a map reading/look-up to extrapolate where the car would come to a halt if ideally managed by the driver and traffic conditions. Again, refer to FIG. 3. Simple calculations can suffice and yield acceptable results. e.g. an electric vehicle's long-term average kWh/ mile consumption figure could be used: Assuming it is 240 Wh/mile at the current speed, which converts to 864 kJ/mile, and that the car maintained 60 mph while investing the electrical energy to gain 360 kJ of potential energy over a 30 second interval (equivalent to an elevation gain of 100 m with a 1200 kg vehicle: Potential Energy=mgh=1200 kg*say30 m*10 m/s^2), one should expect that an accurate energy consumption gauge would reflect a significant range change only if there were extra losses in drivetrain efficiency; ie in the motor or batteries, due perhaps to higher current draws. The energy consumption gauges typical in prior art would reflect upwards of 120+360=480 kWh consumed, and estimated range might be dropped accordingly.

Over the long-term, the gauges may generally continue to do a simplistic average (FIG. 2) over several hours and a return trip, and will to some extent average out these peaks, but the driver has had inadequate or incorrect real-time information to help him or her try changes in driving technique or style, to see what positive effect they may have had on fuel economy. They are instead left with thoughts like "Guess it was poor mpg. Maybe I need to go slower uphill; it read heavy consumption back there", which is an example of a conclusion often incorrect under some conditions. Using the proposed method and displaying the superior real time result, the anticipation is built-in (perhaps to a selectable amount), that one will later recover much of the energy by using less electricity while descending the other side of the hill. This affords the driver a display of how efficiently the vehicle and its drivetrain are actually functioning over the interval just measured; perhaps 1 second ago.

Examples of slope/grade information include accelerometers, either built into the vehicle, supplied by a cellphone, or other plug-in or wireless device, or by map lookup or GPS integration. If the vehicle senses acceleration changes to an amount not correlating to a change in horizontal speed alone, a slope and corresponding change in potential energy has happened. In one example, the gauge may be configured to use the acceleration, including its vertical component, but its horizontal component can be used if it is deemed a convenient source of speed change information via time integration) and speed, or grade or altitude information, to determine the altitude gained, and multiply it by the mass of the vehicle in order to compute the gain or loss in potential energy (mass*gravity*(height change)), and obtain the gain or loss in kinetic energy by ½*mass*(speed change)^2. The estimated range remaining may be calculated based on estimations of how far the vehicle in average conditions will coast assuming a return to an original starting elevation and speed. Assumption of zero speed and trip-start elevation and a temporary reset to current speed and elevation is the preferred embodiment.

The accuracy and timeliness of the improvement in indicated fuel consumption then allows vehicle operators to see how efficient a gear they are in for the given speed, wind, road surface, terrain, etc. Prior art requires the driver to drive at a constant speed over a sustained slope and road surface quality for appreciable time in order to allow the common fuel-time-speed integration gauge to suggest an average e.g. mpg achieved. Traffic and road conditions often to not allow this; a single other driver in the way, or threatening to be in the way, or a bump in the road sufficient to cause a finely held gas pedal in a vehicle with an automatic transmission to move sufficiently to result in a gear change; either event will ruin what amounts to a long measurement experiment. With the proposed invention, the driver can relatively immediately see the fuel or electricity consumption along a given stretch of road in a given gear at a given speed, at one glance, quickly change speed or gear, and see the difference in efficiency, while under approximately the same wind, road surface, etc. condition, since it is only seconds in time later on the same stretch of road.

A few examples to further illustrate the usefulness of the invention: When using/requesting both potential and kinetic energy augmentation in the primary consumption level display (e.g. be it a number, graph, etc. as has been the practice in general for data displays), lower than normal fuel efficiency indications are a now more reliable, immediate, and valuable diagnostic for the vehicle operator: Perhaps wheel misalignment occurred after a bump. It can then be caught at an early enough stage to prevent expensive tire wear or accidents at higher speed. It could be an early warning of low tire inflation pressure, possibly signifying a puncture. Perhaps something has come loose on a roof rack and now causes more drag and is in danger of falling off and causing a hazard. Perhaps the fuel obtained at the last fillup is of lower quality or energy content.

Existing methods of supplying grade information include accelerometers, either built into the vehicle, supplied by a cellphone, by map lookup or GPS integration.

Formulae may be added to the algorithm in different ways. The method shown in FIG. 3 applies a form of integration over terrain given an assumed vehicle speed profile. One could alternatively add the effect in earlier if that is more easily implemented with the tools on hand, or judged to result in a nicer display.

When more accurate results are desired (e.g. 'calibration'), the simulation may be tuned by adjusting its setting to mimic actual results obtained by data collection over time. Those trained in the art can include math to progressively 'learn' the vehicle's characteristics over time and different conditions, given the sensors and the overall proposed invented algorithm aspects, resulting in ever more accurate instrumentation and vehicle diagnostic capabilities.

FIG. 3 used simplified expressions for estimating energies and extrapolating range, but there are far more accurate mathematical solutions that can be employed for the purpose. Taking road surface readings from a map or estimating them through calculations quantizing drag components, and with deceleration measured, logged, and updated as the vehicle travels different roads, and has its relationship with speed established; e.g. usually higher speeds result in higher deceleration rates due to nonlinear wind resistance.

FIG. 3 and these examples illustrate to engineers or programmers how and where to insert their math of choice in order to customize the proposed invention. Those skilled in the art will understand that a system may be configured in different ways given particular parameters desired.

The kinetic energy to miles extrapolation may be as simple as a look-up table containing coasting distance versus speed if one has been developed or tuned for the vehicle, perhaps based on previous measurements. In another example, a constant, average or piecewise deceleration can be assumed and used in: potential coasting distance=initial_speed*t−½*deceleration*t^2. Where t is the interval of time. An example result would be '12 mph gained; enough to go an extra 80 meters to a halt]', or '12 mph gained; enough to coast 130 m until I'm back down to the 50 mph I started at.', which is the preferred embodiment of the rule/assumption that has to be made in order to extrapolate the consumption and miles in a manner meaningful to the driver. The short-term mpg can be thus calculated, and longer term averages and remaining range figures can be updated based on short and prior long term calculations and the amount of fuel or electrical energy reserve remaining.

another embodiment can include using sensors and data storage to parameterize the user's typical commute or other repeated trips. The knowledge thus gained can be used to calculate an average expected mpg for the trip. Since the topography and possibly also other conditions are known, the system can calculate even more precisely when fuel is being wasted or conserved at a rate different than the average or different than at that point on previous trips. This allows a display to provide information that might include today's mpg differences (above or below historical average, accounting for wind and temperature), or messages to highlight significant differences. Any long-term differences that are not accountable by temperature, rain, wind resistance etc. provide diagnostic information about the vehicle drivetrain health; e.g. tire pressure, fuel problem etc. Shorter term or occasional indicated mpg variations, on the other hand, effectively teach the driver how to best drive the route.

Prius pulse and glide example—people are currently fighting the existing engine shutdown rpm etc. settings while decreasing the fraction of time they can devote to driving safely. In those cases, the proposed invention makes their efforts easier, likely enables higher efficiency, and increases safety.

Catch All for Claim Support:

The invention provides two methods. The first is a method for a user to override configurations and control decisions, by providing a user access to control variables (e.g. switch states), a presentation of a contract and terms which warn them of general and feature-specific associated risks/consequences, subsystems for logging the response, authenticating, and propagating the information to locations where the vendor and other customers can verify the decisions made. The control variables may include states of switches, relays, other actuators, output voltages or currents, or content on displays. A decision to be overridden may involve diesel engine purge cycle timing. Alternatively, a decision to be overridden may involve a hybrid drivetrain battery charging, or may involve a hybrid drivetrain changing the relative allocations of power to and from subsystems/subcomponents. Or, a decision to be overridden involves redirection of energy into smaller capacity fast-charge, fast results storage or larger capacity zones. Alternatively, a decision to be overridden may involve redirection of energy into different energy storage systems with different characteristics. Alternatively, a decision may be made for economic or performance reasons. A decision may be made to alter the method of computing the energy usage for a vehicle. The presentation or user interface may illustrate estimates of the degree of risk involved. The authentication system may offer different levels of access to control. e.g. 'parental controls'. The information may be propagated to customers, or alternatively, may be propagated to marketing representatives, or may be propagated to locations to support manufacturer assertions of blame in the event of customer dissatisfaction.

The second method provides an enhanced vehicle efficiency measurement for real time display, by using sensors, data, and extrapolation techniques to account for the effects of changes in kinetic and potential energy, terrain, and traffic conditions. The sensors may include, but are not limited to an odometer, a speedometer, devices or techniques for estimating or weighing the vehicle in order to determine its current mass, a global positioning system (GPS), fuel or energy flow devices or techniques, altitude measurement or estimation devices or techniques, moisture sensors to detect road conditions. The sensors may report data on other vehicles, and may share information among vehicles when users request and allow access. Data may include performance data paramaterizing or simulating the performance of energy storage systems (e.g. different batteries) under different conditions, vehicle simulation parameters, vehicle subsystem simulation parameters, terrain map(s), external data accessed remotely and which may change, road conditions, vehicle mass. The extrapolation techniques may include integration over time and distance, include assumptions of constancy in time or distance derivatives of parameter or variables, over an interval, linear interpolation, piecewise integration, assumptions for conditions affecting the result but that are not readily available or convenient to obtain more directly, and other data relevant to a user. Extrapolation techniques may alternatively include different units of measure and conversions, look-up tables, access to remote resources traffic conditions, weather artifacts, reaction to other vehicles, or other known techniques. The extrapolation techniques may also address vehicle or occupant health diagnostics. The display may include any of: numbers, text, graphics, storage, recall, remote connection, or other data viewing formats. The display may additionally display to/contact remote databases or personnel. The display graphics may include but are not limited to any of: filled black and white or colors, motion, blinking, highlighting, strip charts, graphs, or other display graphics known in the art.

Boiler Plate:

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more transitory or non-transitory computer-usable or computer-readable media may be utilized. For example, computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The invention claimed is:

1. A method for enhanced vehicle efficiency measurement and display, comprising:
measuring energy consumed over an interval;
measuring a first distance traveled over the interval;
calculating an extrapolated distance due to changes in potential and in kinetic energy over the interval;
summing the first distance and the extrapolated distance to obtain a summed distance;
dividing energy consumed by the summed distance to yield an effective energy efficiency; and
displaying the effective energy efficiency compared to that which could be achieved under different conditions;
wherein calculating the extrapolated distance due to changes in potential and in kinetic energy over the interval comprises processing output of one or more sensors, the one or more sensors including at least one of an odometer, speedometer, tachometer, compass, devices or techniques for measuring or estimating fuel or energy remaining, mass of vehicle, GPS, fuel or energy flow, engine or motor load, altitude measurement or estimation, moisture, water, ice or other road conditions.

* * * * *